(12) United States Patent
Borchert et al.

(10) Patent No.: US 7,810,666 B2
(45) Date of Patent: Oct. 12, 2010

(54) FUEL TANK SEAM WITH LEAD-THROUGH MEANS

(75) Inventors: Matthias Borchert, Bonn (DE); Gerd Wolter, Konigswinter (DE); Harald Lorenz, Bad Neuenahr-Ahrweiler (DE); Dirk Eulitz, Bonn (DE); Timo Kramer, Hirz-Maulsbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 556 days.

(21) Appl. No.: 11/774,168

(22) Filed: Jul. 6, 2007

(65) Prior Publication Data

US 2008/0061066 A1   Mar. 13, 2008

Related U.S. Application Data

(60) Provisional application No. 60/806,744, filed on Jul. 7, 2006.

(51) Int. Cl.
B65D 6/00 (2006.01)
B65D 6/32 (2006.01)
B65D 6/40 (2006.01)

(52) U.S. Cl. .............. 220/4.13; 220/4.14; 220/586
(58) Field of Classification Search ............ 220/4.13, 220/4.14, 586
See application file for complete search history.

(56) References Cited

U.S. PATENT DOCUMENTS

| | | | | |
|---|---|---|---|---|
| 3,477,611 A | * | 11/1969 | Niles | 220/86.2 |
| 3,712,250 A | * | 1/1973 | Geyer et al. | 105/360 |
| 3,779,420 A | * | 12/1973 | Knaus | 220/4.14 |
| 3,801,402 A | * | 4/1974 | Suter | 156/182 |
| 3,912,107 A | * | 10/1975 | Baumann | 220/563 |
| 4,036,390 A | * | 7/1977 | Morse | 220/562 |
| 4,318,491 A | * | 3/1982 | Nelson et al. | 220/566 |
| 4,360,124 A | * | 11/1982 | Knaus et al. | 220/62.19 |

(Continued)

FOREIGN PATENT DOCUMENTS

EP   1510391   6/2004

(Continued)

OTHER PUBLICATIONS

PCT Search Report and Written Opinion dated Sep. 14, 2007 received in corresponding International Application No. PCT/EP2007/005151, 10 pgs.

(Continued)

*Primary Examiner*—Anthony Stashick
*Assistant Examiner*—Ned A Walker
(74) *Attorney, Agent, or Firm*—Grossman Tucker Perreault & Pfleger, PLLC

(57) ABSTRACT

The invention concerns a fuel tank (1) of thermoplastic material comprising at least one peripherally extending seam (3) in the form of a welded or squeeze seam, at least one filling opening, air intake and venting means and means for delivering and removing fuel in relation to an internal combustion engine of a motor vehicle, wherein the fuel tank has at least one lead-through means (5) for lines which are to be passed out of the tank. The fuel tank (1) according to the invention is distinguished in that the lead-through means (5) passes through the seam (3) of the tank and extends at an angle relative to the course of the seam (3).

7 Claims, 4 Drawing Sheets

U.S. PATENT DOCUMENTS

| | | | |
|---|---|---|---|
| 4,435,240 A * | 3/1984 | Knaus et al. ................ 156/242 |
| 4,475,662 A * | 10/1984 | Mandel ...................... 220/589 |
| 4,561,476 A * | 12/1985 | Bunkoczy .............. 141/311 R |
| 4,790,472 A * | 12/1988 | Bunkoczy ................... 228/171 |
| 5,226,564 A * | 7/1993 | Steer et al. .................. 222/107 |
| 5,443,784 A * | 8/1995 | Celerier et al. .............. 264/571 |
| 5,454,480 A * | 10/1995 | Morris, Jr. ................. 220/4.14 |
| 5,653,358 A * | 8/1997 | Sneddon ..................... 220/590 |
| 5,797,513 A * | 8/1998 | Olinger et al. ......... 220/592.27 |
| 5,971,198 A * | 10/1999 | Olinger et al. ......... 220/592.27 |
| 6,179,145 B1 | 1/2001 | Roth |
| 6,347,719 B1 * | 2/2002 | Rosen et al. ............... 220/4.14 |
| 6,409,040 B1 * | 6/2002 | Distelhoff et al. ........... 220/562 |
| 6,491,180 B2 * | 12/2002 | Distelhoff et al. ........... 220/562 |
| 6,669,043 B2 * | 12/2003 | Fish et al. .................. 220/4.14 |
| 6,712,234 B2 * | 3/2004 | Boecker ...................... 220/563 |
| 6,746,560 B1 * | 6/2004 | Humphrey et al. ..... 156/244.11 |
| 6,755,219 B1 | 6/2004 | Bolle |
| 6,808,675 B1 * | 10/2004 | Coelho et al. ................ 264/545 |
| 6,905,041 B1 * | 6/2005 | Taketsu et al. .............. 220/562 |
| 7,211,307 B2 * | 5/2007 | Potter et al. ................ 428/36.7 |
| 7,427,000 B2 * | 9/2008 | Austerhoff et al. ......... 220/4.14 |
| 2002/0053566 A1 * | 5/2002 | Balzer et al. .............. 220/4.13 |
| 2004/0009315 A1 | 1/2004 | Potter et al. |
| 2005/0011891 A1 * | 1/2005 | Austerhoff et al. ......... 220/4.12 |
| 2009/0045542 A1 * | 2/2009 | Borchert et al. ........ 264/171.12 |
| 2009/0047375 A1 * | 2/2009 | Borchert et al. ............. 425/541 |

FOREIGN PATENT DOCUMENTS

| | | |
|---|---|---|
| GB | 2390582 | 1/2004 |

OTHER PUBLICATIONS

English Translation of International Preliminary Report on Patentability issued in related International Patent Application No. PCT/EP2007/005151 dated Jan. 22, 2009.

* cited by examiner

FUEL TANK SEAM WITH LEAD-THROUGH MEANS

CROSS-REFERENCE TO RELATED APPLICATIONS

This application claims priority to U.S. Provisional Application 60/806,744 filed Jul. 7, 2006.

FIELD

The invention concerns a fuel tank of thermoplastic material comprising at least one peripherally extending seam in the form of a welded or squeeze seam, at least one filling opening, air intake and venting means and means for delivering and removing fuel in relation to an internal combustion engine of a motor vehicle, wherein the fuel tank has at least one lead-through means for lines which are to be passed out of the tank. Such tanks are produced either by extrusion blow moulding or by welding injection-moulded or deep-drawn half-shell portions. Plastics tanks for fuels are generally produced from multi-layer plastic extrudates which are provided with barrier layers for hydrocarbons as polyolefins or similar thermoplastic materials swell in the presence of hydrocarbons and/or are permeable in relation thereto.

BACKGROUND

From environmental protection points of view it is desirable to make fuel tanks of as high a level of sealing integrity as possible, that is to say very substantially to avoid hydrocarbon emissions. Weak points of such tanks are still seams and openings with connection nipples, valves or the like. Besides a filling opening, a fuel tank also has to include venting and draw-off openings as well as lead-through means for electrical lines. Finally it is necessary for the units which are arranged in the fuel tank such as for example the fuel pump to be supplied with electrical power.

Lead-through means provided for that purpose in the tank represent potential leakage points for hydrocarbons. Fundamentally it is desirable very substantially to avoid such potential leakage points.

Therefore the object of the invention is to provide a fuel tank of thermoplastic material, in which the number of lead-through means required through the tank wall is restricted to a minimum.

SUMMARY

That object is attained with a fuel tank of the kind set forth in the opening part of this specification, which is distinguished in that the lead-through means passes through the seam of the tank and extends at an angle relative to the course of the seam.

The invention can be summarized to the effect that the required lead-through means for taking off fuel and venting the container as well as for electrical lines are arranged in a region of the tank which can represent a potential leakage point and which, due to the manner of manufacture involved, cannot be avoided. When the fuel tank is manufactured by extrusion blow moulding of a tubular preform, the tank has a peripherally extending squeeze seam in the region of the division of the mould tool halves. If the fuel tank is produced from deep-drawn or injection-moulded half-shell portions, there is a peripherally extending welded seam at a peripherally extending edge region of the tank, which is of a flange-like configuration. Finally the fuel tank according to the invention can also be blow moulded from extrudates in web or band form, whereby a peripherally extending seam location is also formed.

Preferably the wall of the tank comprises a multi-layer extrudate with at least one barrier layer for hydrocarbons. Here for example EVOH (ethylene vinyl alcohol copolymer) presents itself as the barrier material.

In a preferred embodiment of the fuel tank according to the invention it is provided that it is composed at least of two shell portions which each form a respective flange-like edge in the region of the seam.

The lead-through means can extend transversely to the course of the seam and in the separation plane of the shell portions.

Preferably the lead-through means is provided within an insert or inlay portion which passes through the seam.

The inlay portion can at least partially comprise plastic material and be welded to the plastic material of the tank in the seam. By way of example in production of the fuel tank by extrusion blow moulding of a plurality of preforms in web form, that inlay portion can be introduced into the plastic intermediate product in an intermediate step by means of a manipulator or the like. In definitive shaping of the finished tank, the inlay portion is then welded in the shaping operation to the material of the wall in the region of the seam.

Therefore when connecting the shell portions of the tank the inlay portion can have been laid between the peripherally extending edges and welded thereto.

The plug connector can form a plurality of lead-through means. By way of example the plug connector can provide both lead-through means for draw-off and venting conduits and also can have electrical contacting means.

All conduits can already be mounted to the plug connector on the inside of the tank.

DESCRIPTION OF THE DRAWINGS

The invention is described hereinafter by means of an embodiment by way of example illustrated in the drawings in which.

DETAILED DESCRIPTION

Figure 1:
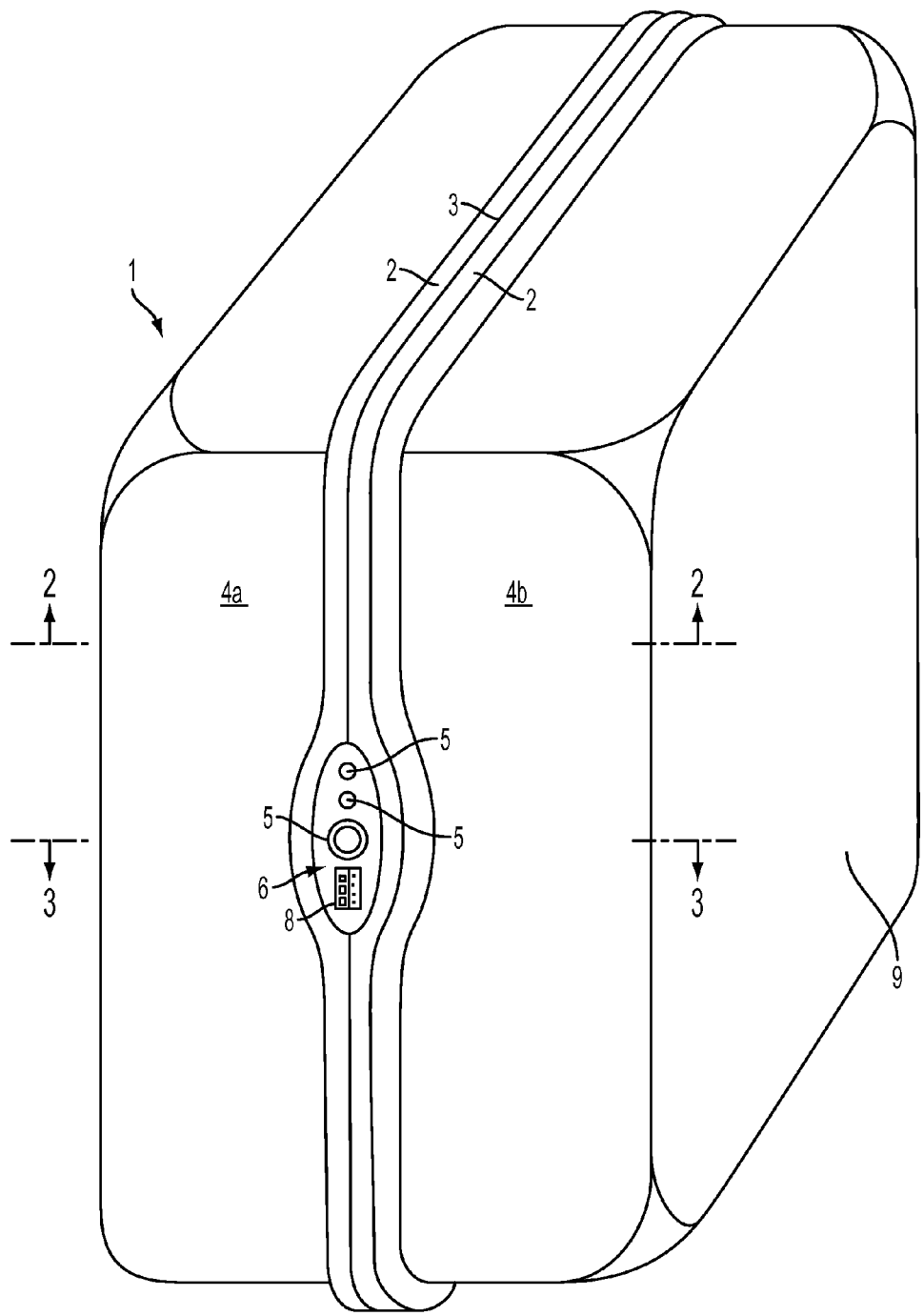
FIG. 1 is a diagrammatic view of a fuel tank according to the invention.
Figure 2:
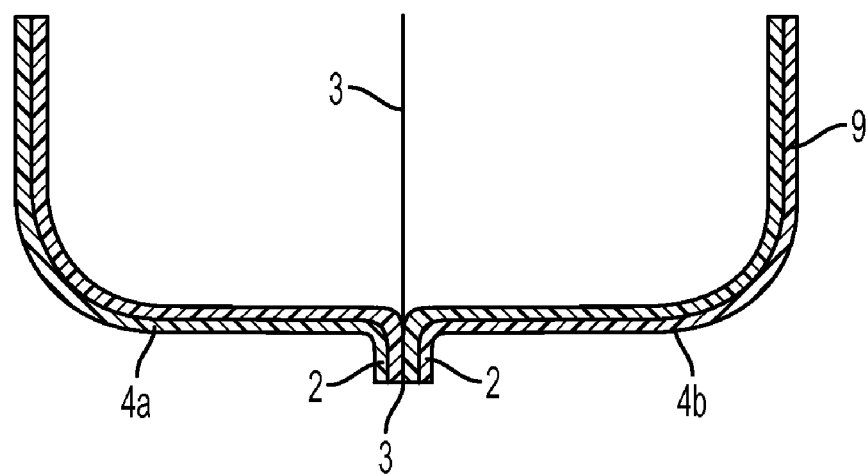
FIG. 2 is a view in section taken along lines II-II in FIG. 1.

The fuel tank 1 according to the invention is shown in greatly simplified form in FIG. 1. It was produced by extrusion blow moulding of two extrudates in web form, in a multi-stage shaping procedure, more specifically using a three-part tool comprising two outer moulds and a central mould. In that procedure, firstly two extrudates in web form were placed in the first heat, that is to say when in a still plastic condition and without further heating, between the outer moulds and the central mould. The outer moulds each have sub-cavities which correspond to the later external contour of the finished fuel tank. In a first step the outer moulds are closed against the central moulds, in which case the preforms are respectively arranged between the outer mould and the central mould. The preforms are then expanded within the mould and caused to bear against the inside surfaces of the sub-cavities of the outer moulds. In the present invention, inlay portions are arranged within the half-shell portions of the tank, which are produced in that way, by way of component holders or the like which may be arranged in the central mould. The inlay portion which is still to be described hereinafter and which has the lead-through means can be placed in that case during the first shaping stage for the half-shell portions, in the region of the edges thereof, which are of a flange-like configuration. The outer moulds are then moved away from each other, the central mould is moved away from between the outer moulds and the outer moulds are moved against each other so that the half-shell portions of the fuel tank are welded together in the region of their edges which extend flange-like around the tank.

The half-shell portions of the fuel tank 1 are formed from a six-layer co-extrudate with a barrier layer for hydrocarbons, which is embedded therein. As can be seen from FIG. 1, the fuel tank 1 has a peripherally extending seam 3 at which the edges 2 of the half-shell portions 4*a*, 4*b* of the fuel tank 1, which are of a flange-like configuration, are welded together. The fuel tank 1 is further provided with a usual filler pipe which is not shown in the Figures for reasons of simplification.

In addition the fuel tank 1 is greatly simplified in respect of its geometry. It will be self-evident to the man skilled in the art that the fuel tank 1 can be of a comparatively irregular and rugged and complex external structure.

In a manner in accordance with the invention provided on the fuel tank 1 are a plurality of lead-through means 5 which pass through the seam 3 of the fuel tank in such a way that they form an interface of the fuel tank 1. The lead-through means 5 are arranged in a multi-function coupling 6 in the form of an inlay portion. That multi-function coupling 6 has a main body 7 of thermoplastic material, which in the illustrated embodiment has a total of three lead-through means 5 and an electrical plug contact 8. See FIG. 6. It will be apparent to the man skilled in the art that the multi-function coupling 6 can have any number of electrical plug contacts 8 and lead-through means 5 respectively and that the number and arrangement of the lead-through means 5 and electrical plug contacts 8 are subject to a certain freedom of choice.

As already mentioned above the multi-function coupling 6 is inserted in the form of an inlay portion into the seam 3 of the fuel tank 1 and welded to the wall 9 of the fuel tank in that region. See FIG. 5. The main body 7 can for example comprise polyethylene or another plastic material which is weldable to the wall 9 of the fuel tank 1.

Alternatively the main body 7 of the multi-function coupling 6 may be composed of a plurality of plastic material components, wherein preferably the outer enclosure of the main body 7 comprises a plastic material which is weldable to the wall 9 of the fuel tank 1 whereas the rest of the main body 7, in the region of the lead-through means 5 or in the region of the electrical plug contact, can comprise a plastic material which does not swell in the presence of fuels, for example POM (polyoxymethylene).

Figure 3:
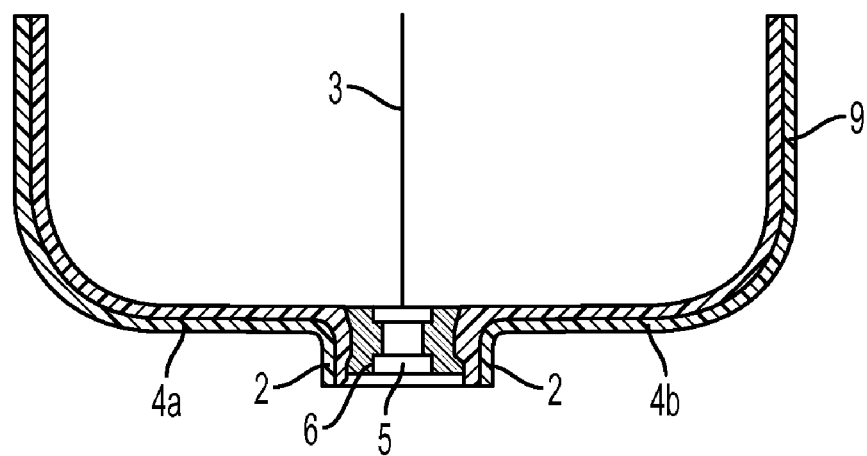
FIG. 3 is a view in section taken along lines III-III in FIG. 1.
Figure 4:
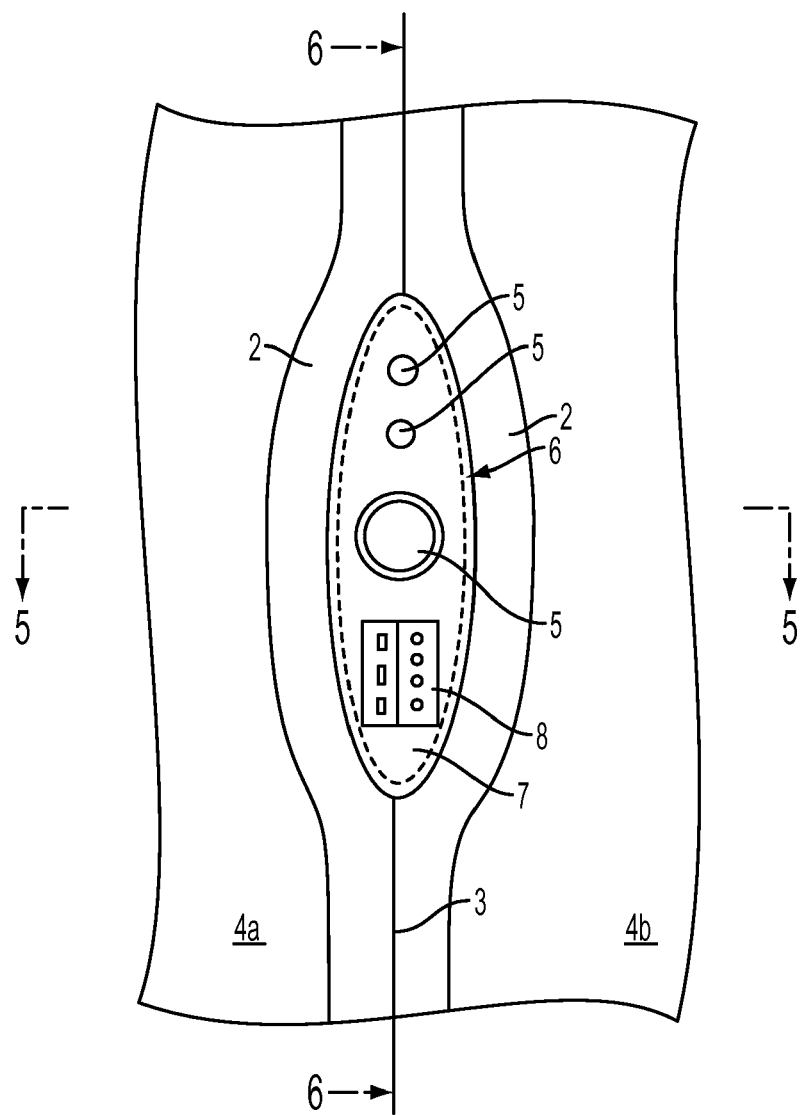
FIG. 4 shows a detail view on an enlarged scale of the lead-through means, which is involved here, through the fuel tank.
Figure 5:
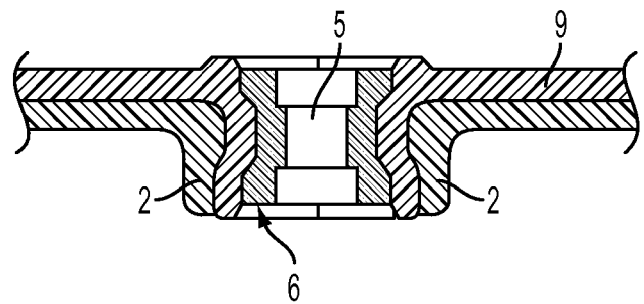
FIG. 5 shows a view in section taken along lines V-V in FIG. 4.
Figure 6:
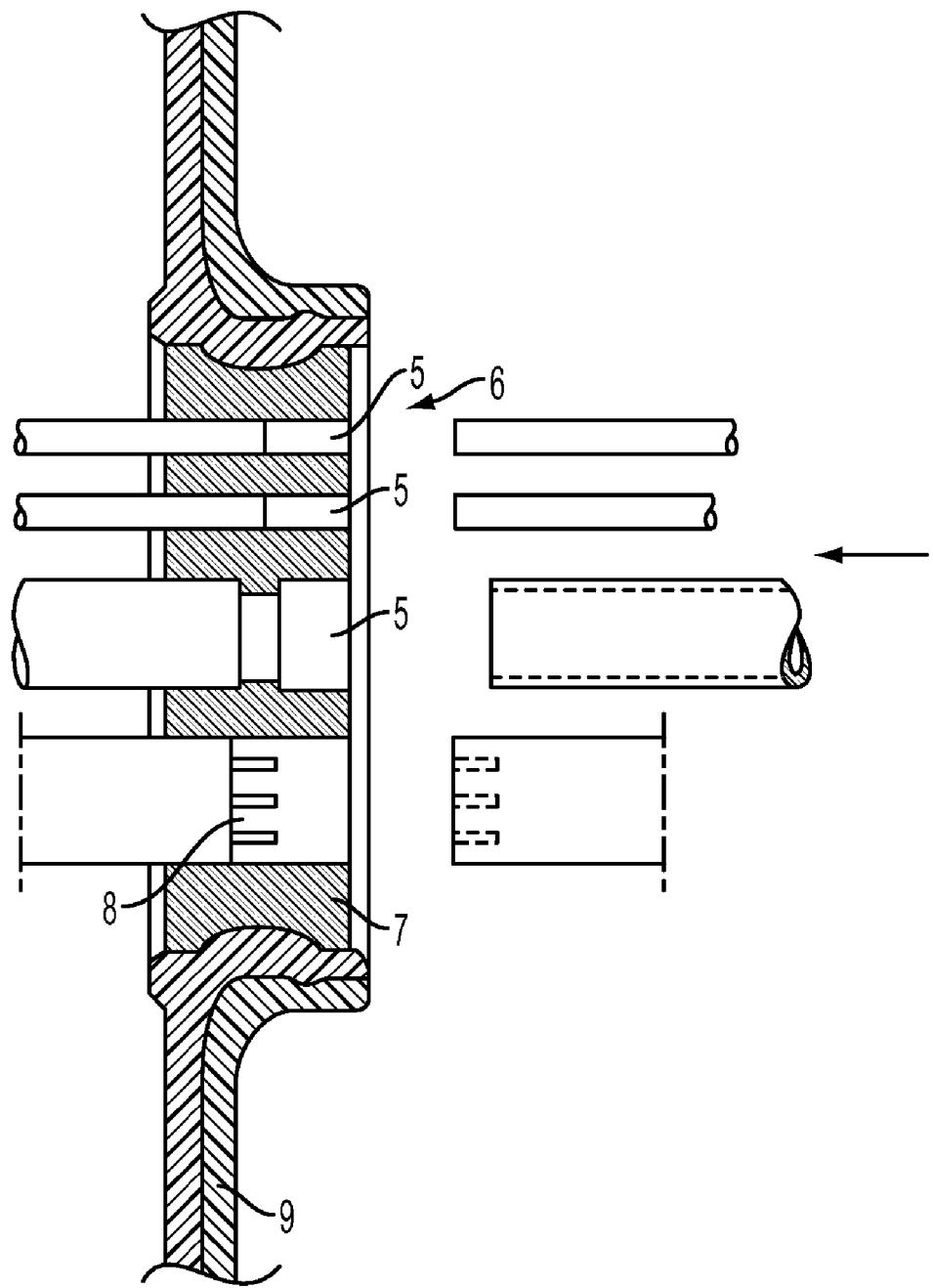
FIG. 6 shows a view in section taken along lines VI-VI in FIG. 4.

As can be seen in particular from FIGS. 3, 5 and 6, the lead-through means 5 and the electrical plug contact 8 extend transversely with respect to the course of the seam 3 and in the separation plane of the half-shell portions 4*a*, 4*b*.

As can be seen from FIG. 6 the lead-through means 5 can be of such a nature that air intake and venting conduits pass completely therethrough. It will be noted however that the lead-through means can also be so designed that they form coupling projections for lines and conduits which are to be connected, for example of a fir tree-shaped profile for crimping flexible lines and conduits thereon.

The invention claimed is:

1. A fuel tank of thermoplastic material comprising:
a first shell portion of multi-layer extrudate and a second shell portion of multi-layer extrudate, said first shell portion comprising a first sidewall and a first peripherally extending flange, and said second shell portion comprising a second sidewall and a second peripherally extending flange;
a multifunction panel comprising at least one lead-through means extending for lines which are to be passed out of the tank; and,
wherein said first and second flanges are joined together to form at least one peripherally extending seam in the form of a welded or squeeze seam, said seam protruding from the first and second sidewalls, wherein said at least one lead-through means passes through said multifunction panel, and wherein said multifunction panel is embedded within a portion of said seam and is surrounded by said seam, and wherein said multifunction panel is disposed in a separation plane between said first and second shell portions, and wherein said at least one lead-through means extends at an angle relative to said separation plane and comprises an air intake or venting conduit or an electrical connector.

2. A fuel tank according to claim 1, characterized in that said first and second sidewalls comprise a multi-layer extrudate with at least one barrier layer for hydrocarbons.

3. A fuel tank according to claim 1, characterized in that said at least one lead-through means extends transversely relative to said separation plane.

4. A fuel tank according to claim 1, characterized in that said multifunction panel is provided as an insert or inlay portion which passes through said seam.

5. A fuel tank according to claim 4, characterized in that at least a portion of said insert or inlay portion comprises a plastic material and is welded to the plastic material of the tank in the seam.

6. A fuel tank according to claim 4, characterized in that said insert or inlay portion is inserted between said first and second peripherally extending flanges and welded thereto.

7. A fuel tank according to claim 4, characterized in that said insert or inlay portion is in the form of a plug connector.

\* \* \* \* \*